US009946727B2

(12) United States Patent
Bareket et al.

(10) Patent No.: US 9,946,727 B2
(45) Date of Patent: Apr. 17, 2018

(54) SYNCHRONIZING USER STATES ACROSS MULTIPLE CLIENTS OF A NAS SYSTEM

(71) Applicant: INTERNATIONAL BUSINESS MACHINES CORPORATION, Armonk, NY (US)

(72) Inventors: Amit Bareket, Yavne (IL); Shai M. Koffman, Hod Hasharon (IL); Moshe Weiss, Petah Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 327 days.

(21) Appl. No.: 14/307,812

(22) Filed: Jun. 18, 2014

(65) Prior Publication Data
US 2015/0370788 A1    Dec. 24, 2015

(51) Int. Cl.
G06F 7/00        (2006.01)
G06F 17/30    (2006.01)

(52) U.S. Cl.
CPC ...... *G06F 17/302* (2013.01); *G06F 17/30174* (2013.01); *G06F 17/30197* (2013.01); *G06F 17/30351* (2013.01); *G06F 17/30575* (2013.01); *G06F 17/30581* (2013.01)

(58) Field of Classification Search
CPC ......... G06F 17/30581; G06F 17/30203; G06F 17/30864
See application file for complete search history.

(56) References Cited

U.S. PATENT DOCUMENTS

| | | | | |
|---|---|---|---|---|
| 6,516,337 B1 * | 2/2003 | Tripp | ................ | G06F 17/30613 707/999.104 |
| 6,675,205 B2 * | 1/2004 | Meadway | ......... | G06F 17/30109 707/999.01 |
| 6,694,335 B1 * | 2/2004 | Hopmann | ......... | G06F 17/30581 707/624 |
| 8,458,363 B2 | 6/2013 | Rosenblatt | | |
| 2002/0165625 A1 * | 11/2002 | Beier | ................ | G06F 17/30067 700/50 |
| 2007/0130217 A1 * | 6/2007 | Linyard | ............ | G06F 17/30581 |
| 2007/0206610 A1 * | 9/2007 | Teodosiu | ............ | H04W 76/023 370/400 |
| 2008/0005121 A1 * | 1/2008 | Lam | ................... | G06F 17/30067 |
| 2009/0043828 A1 * | 2/2009 | Shitomi | ............ | G06F 17/30221 |

(Continued)

*Primary Examiner* — Hasanul Mobin
(74) *Attorney, Agent, or Firm* — Griffiths & Seaton PLLC

(57) ABSTRACT

Methods, computing systems and computer program products implement embodiments of the present invention that include detecting, by a file-level storage system such as a network attached storage system, a user operating a first computer in communication with the file level storage system via a network, and maintaining, while the user is operating the first computer, multiple states for the user. In some embodiments, the user may operate the first computer by logging on to the first computer, and executing one or more applications and data files. Upon detecting the user operating a second computer in communication with the file level storage system via the network, the file-level storage system can synchronize applications and data files on the second computer to the multiple states. In embodiments of the present invention, the user operates the second computer by logging on to the second computer while still logged on to the first computer.

20 Claims, 5 Drawing Sheets

(56) References Cited

U.S. PATENT DOCUMENTS

| | | | |
|---|---|---|---|
| 2009/0052804 A1* | 2/2009 | Lewis | G06F 17/30011 |
| | | | 382/298 |
| 2009/0209236 A1* | 8/2009 | Bloebaum | G06N 3/006 |
| | | | 455/414.1 |
| 2009/0285506 A1* | 11/2009 | Benson | G06F 3/1415 |
| | | | 382/299 |
| 2010/0070448 A1* | 3/2010 | Omoigui | H01L 27/1463 |
| | | | 706/47 |
| 2011/0276580 A1* | 11/2011 | Press | G06F 17/30401 |
| | | | 707/759 |
| 2011/0302280 A1* | 12/2011 | McJilton | G06F 3/067 |
| | | | 709/220 |
| 2011/0320407 A1* | 12/2011 | Augustine | G06F 17/30351 |
| | | | 707/636 |
| 2013/0013559 A1 | 1/2013 | Pomerantz | |
| 2013/0117502 A1* | 5/2013 | Son | G06F 11/1662 |
| | | | 711/103 |
| 2013/0198226 A1* | 8/2013 | Dhuse | G06F 17/30106 |
| | | | 707/769 |
| 2013/0332473 A1* | 12/2013 | Ryman | G06F 17/30569 |
| | | | 707/754 |
| 2014/0173230 A1* | 6/2014 | Smith | H04L 67/1095 |
| | | | 711/162 |

\* cited by examiner

FIG. 4

SYNCHRONIZING USER STATES ACROSS MULTIPLE CLIENTS OF A NAS SYSTEM

CROSS-REFERENCE TO RELATED APPLICATIONS

This application is related to U.S. Patent Application titled "Built-In Search Indexing for NAS Systems" filed on even date with the present application, and which is incorporated herein by reference.

FIELD OF THE INVENTION

The present invention relates generally to data storage, and specifically to providing user synchronization services across multiple clients in communication with a network attached storage (NAS) system.

BACKGROUND

Network attached storage (NAS) is file-level computer data storage system connected to a computer network that provides data access to a heterogeneous group of clients. A NAS system typically comprises a computer connected to a network that provides file-based data storage services to other client devices on the network. In operation a NAS system appears to the clients as a file server (the client can map network drives to shares on that server) storing files in a single rooted tree of directories.

The description above is presented as a general overview of related art in this field and should not be construed as an admission that any of the information it contains constitutes prior art against the present patent application.

SUMMARY

{Claim summary will be inserted here in the final version.}

There is provided, in accordance with an embodiment of the present invention a method, including detecting, by a file-level storage system, a user operating a first computer in communication with the file level storage system via a network, maintaining, while the user is operating the first computer, multiple states for the user, detecting the user operating a second computer in communication with the file level storage system via the network, and synchronizing the second computer to the multiple states.

There is also provided, in accordance with an embodiment of the present invention a file-level storage system, including a memory, and a management processor configured to detect a user operating a first computer in communication with the file level storage system via a network, while the user is operating the first computer, to maintain, in the memory, multiple states for the user, to detect the user operating a second computer in communication with the file level storage system via the network, and to synchronize the second computer to the multiple states.

There is further provided, in accordance with an embodiment of the present invention a computer program product, the computer program product including a non-transitory computer readable storage medium having computer readable program code embodied therewith, the computer readable program code including computer readable program code configured to detect a user operating a first computer in communication with the file level storage system via a network, computer readable program code configured to maintain, while the user is operating the first computer, multiple states for the user, computer readable program code configured to detect the user operating a second computer in communication with the file level storage system via the network, and computer readable program code configured to synchronize the second computer to the multiple states

BRIEF DESCRIPTION OF THE DRAWINGS

The disclosure is herein described, by way of example only, with reference to the accompanying drawings, wherein:

FIG. 4 is a schematic pictorial illustration of a display of a given client computer executing multiple applications, in accordance with an embodiment of the present invention.

DETAILED DESCRIPTION OF EMBODIMENTS

Overview

Figure 1:
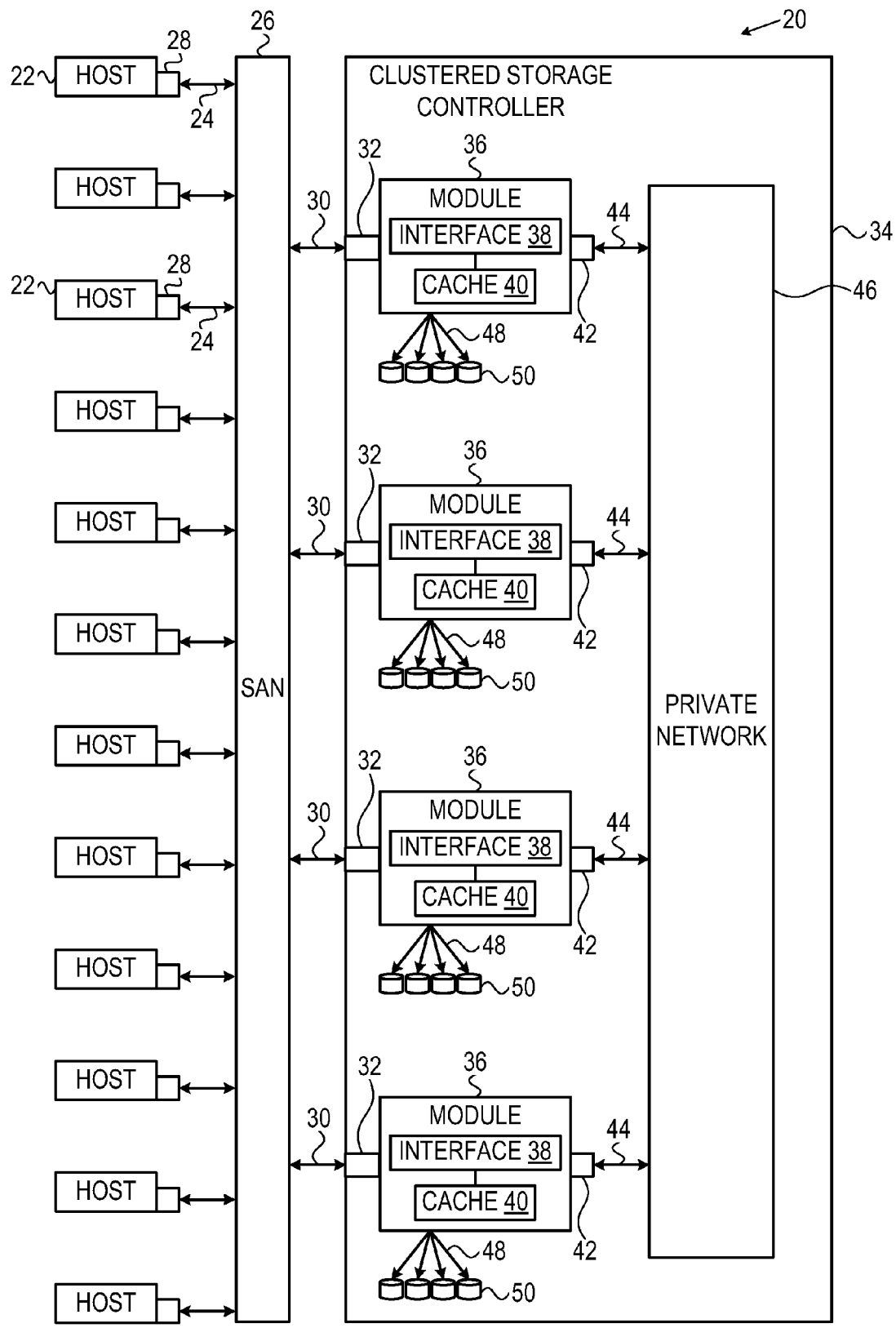
FIG. 1 is a block diagram that schematically illustrates a storage system, in accordance with an embodiment of the present invention.

File-level storage systems such as network attached storage (NAS) systems are typically non-intelligent systems that store files and folders without any intelligent computing cloud services. In a first example, a user operating a first computer loads, from a NAS system, a document (also referred to herein as a data file) into a word processing application for editing, and edits the document. While editing the document, the word processing application can present, on the first computer's display, a specific portion of the document. The specific portion of the document may also be referred to herein as a location in a file. If the user loads the document on a second computer, the second client typically presents, on the second client's display, the beginning of the document.

In a second example, while executing a file management application on the first computer, the user can instruct the file management application to present files in a directory on a NAS system in a "modified date—descending" order. If the user opens the file management application on the second computer, the "modified date—descending" sort order for the files is typically not preserved. In embodiments describe herein, as the user operates the first computer, information such as an executing application, a data file, a location in the data file and sort preferences are referred to herein as "states" for the user.

Embodiments of the present invention provide methods and systems for a file-level storage system (e.g., a NAS system) to synchronize states for a given user across multiple computers networked with the NAS. While embodiments herein describe file indexing services implemented on a network attached storage (NAS) system, the file indexing services may be implemented on any file-level storage system such as Windows™ or Linux™ based file servers.

In some embodiments, a file-level storage system detects a user operating a first computer communication with the file level storage system via a network, and maintains, while the user is operating the first computer, multiple states for the user. In embodiments herein, the user can operate the first computer by logging on to the first computer and executing one or more applications. Upon detecting, the user operating a second computer in communication with the file level storage system via the network, the file-level storage system can synchronize the second computer to the multiple states. In embodiments herein, the user operates the second computer by logging on to the second computer.

As explained hereinbelow, each of the multiple states may consist of a software application, a data file used by the software application and a location in the data file. Therefore, when the user logs on to the second computer, the second computer loads all the applications that the user was working with on the first computer, and presents, on the second computer's display, the applications as they appear on the first computer's display.

Systems implementing embodiments of the present invention enable a user to immediately "pick up" on the second computer where the user "left off" on the first computer. In the first example described supra, if the NAS and the computers implement embodiments of the present invention, then when the user logs on to the second computer, the second computer retrieves the user's states from the NAS. Based on the retrieved states, the second computer executes the word processor application, loads the document and presents, on the second computer's display, the user's last position in the document (i.e., while the user was editing the document on the first computer).

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
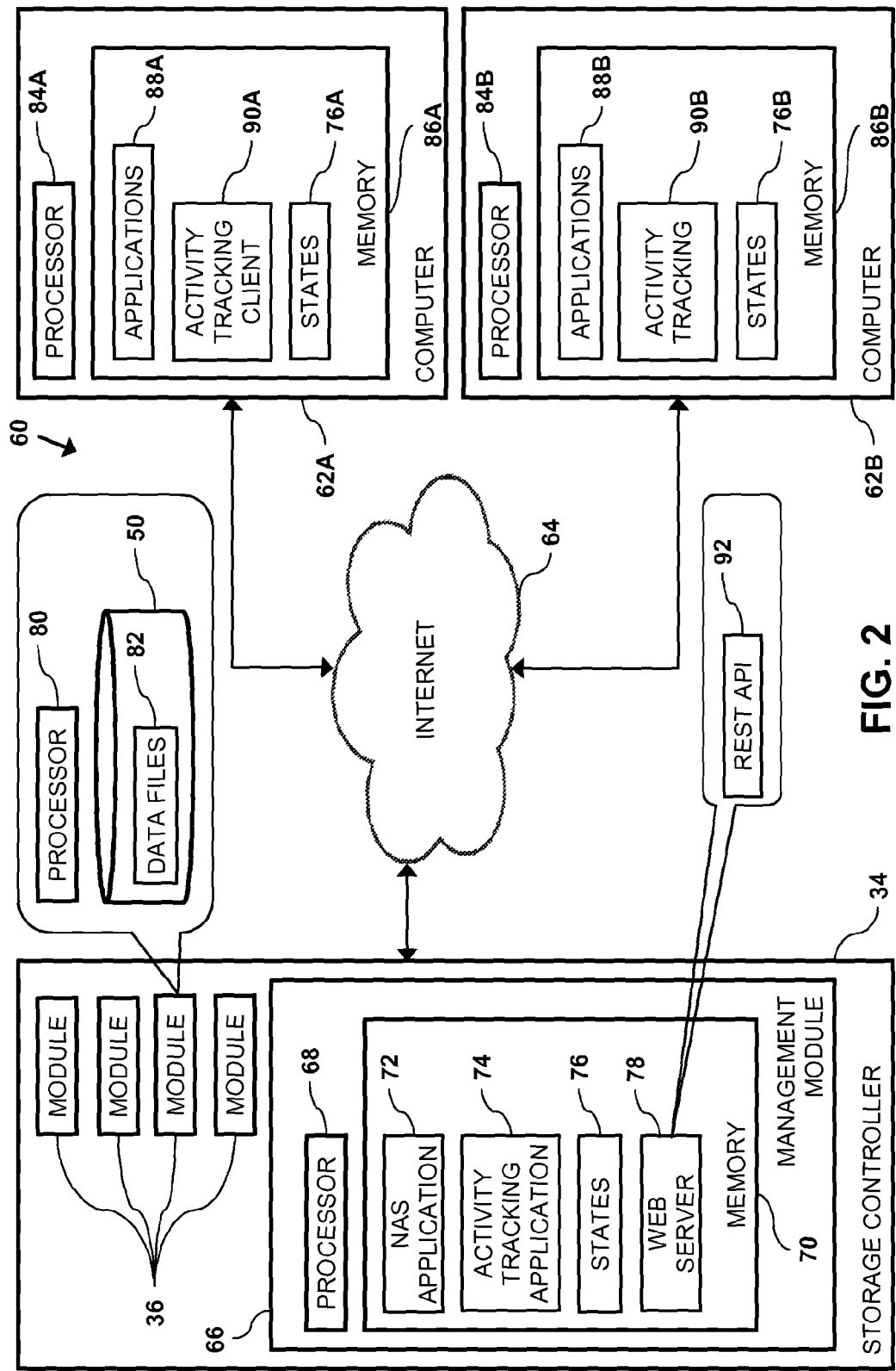
FIG. 2 is a block diagram that schematically illustrates a computing facility comprising the storage system configured to provide network attached storage (NAS) services and to synchronize user states across multiple client computers in communication with the storage system, in accordance with an embodiment of the present invention.

FIG. 2 is a block diagram that schematically illustrates a computing facility 60 comprising a storage controller 34 configured to provide network attached storage (NAS) with user synchronization services to client computers 62 via a network such as Internet 64, in accordance with an embodiment of the present invention. In the configuration shown in FIG. 2, computers 62 and their respective components can be differentiated by appending a letter to the identifying numeral, so that the computers comprise computers 62A and 62B.

While the example in FIG. 2 shows storage controller 34 in communication with a single computer 62 via Internet 64, multiple computers 62 communicating with one or more storage controllers 34 via other types of networks is considered to be the spirit and scope of the present invention. For example, multiple storage controllers 34 and multiple computers 62 can communicate with each other via one or more communications networks such as a wide area network (WAN) and a local area network (LAN).

In addition to modules 36, storage controller comprises a management module 66 that manages the interaction between modules 36 and computers 62. Although not explicitly shown in FIG. 2 for purposes of illustrative simplicity, management module 66 can communicate with modules 36 via private network 46.

Management module 66 comprises a management processor 68 and a management memory 70. In operation, processor 68 executes, from memory 70, a NAS management application 72, a user activity tracking application 74, and a web server 78. NAS management application 72 comprises a software application that enables storage controller 34 to function as a NAS system by receiving and processing file and directory level storage commands. Examples of operations performed by file-level storage commands include, but are not limited to, creating a file, reading data from a file, writing data to a file, copying or moving a file to a new location and deleting a file.

NAS management application 72 is described in more detail in U.S. Patent Application "Built-In Search Indexing for NAS Systems" referenced above. In embodiments described herein, when processor 68 executes NAS application 72, storage controller 34 comprises and may also be referred to as file-level storage system 34 or as NAS system 34.

Each module 36 comprises a module processor 80, and one or more storage devices 50. In operation, module processor 80 is configured to process block level storage commands, and management processor 68 (executing NAS application 72) is configured to process file level storage commands for data files 82 that are stored on storage device(s) 50.

Each computer 62 comprises a client processor 84 and a client memory 86. Processor 84 executes, from memory 86, one or more client applications 88 (e.g., a word processor application, a spreadsheet application and an email client) and an activity tracking client 90. Examples of computers 62 include, but are not limited to, desktop computers, laptop computers, tablet computers, phablets and smartphones. Activity tracking client 90 communicates with activity tracking application 74 and/or web server 78 using protocols such as Network File System (NFS) or Server Message Block (SMB, also referred to as "Samba").

Activity tracking application 74 and activity tracking client 90 comprise software applications that enable processor 68 to maintain and synchronize states 76 of a given user (not shown) between a given computer 62 and management module 66. In embodiments herein, tracking client 90 also functions as an NAS client that enables processor 84 to store and retrieve data from data files 82 (i.e., process file-level storage commands). In alternative embodiments, processor 84 may execute a standalone NAS client application from memory 86. While the example in FIG. 2 shows processor 68 storing user states to memory 70, the management processor may store the user states any storage device 50 in storage controller 34.

For a given user, states 76 maintained by activity application 74 include, but are not limited to:

A given software application 88 executing on a given computer 62.

A given data file in use by the given software application.

A current position in the given data file.

Figure 4:
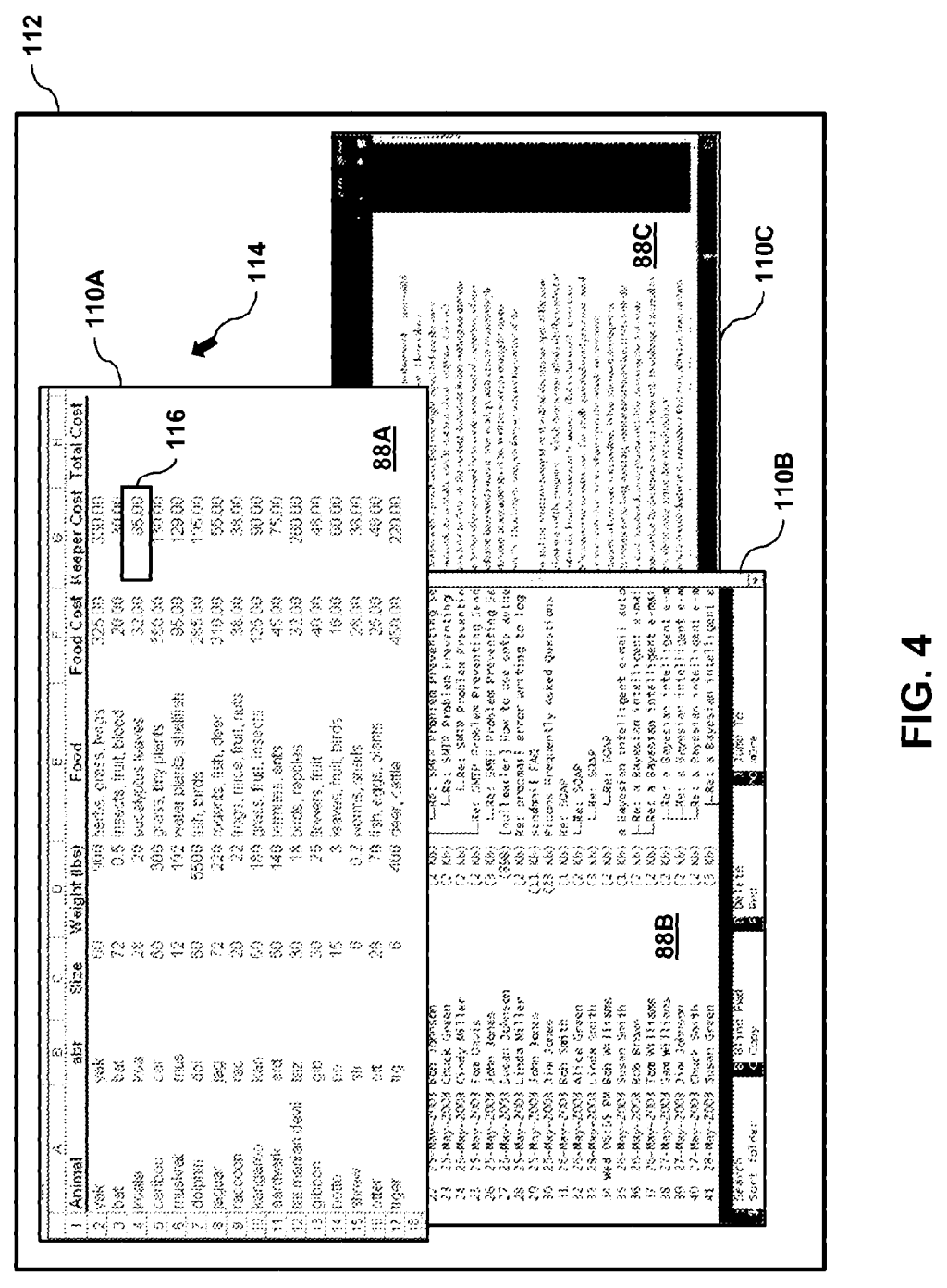

A display layout. The display layout comprises metadata indicating how one or more applications 88 are presented on a display (not shown) coupled to a given computer 62. For example, a given application 88 may be executing in full-screen mode, or in tiled/nested window on the display. An example of a given display layout is shown in FIG. 4 hereinbelow.

One or more additional data files recently accessed by the given client application.

A current position in a file system tree.

Recent file/directory searches.

Recent file/directory sorting preferences.

In operation, activity tracking application 74 can automatically update states 76 upon detecting a specific number of changes to a given state 76, so that if a user is editing a specific paragraph (i.e., a location) of a given word processing file 82 on a first computer 62, and the user logs on to a second computer 62, the second computer will execute a given word processor application 88B, load the given word processor file, and present the specific paragraph on a display coupled to the second computer. In operation, the second computer presents any changes the user made to the specific paragraph while operating the first computer, even if the user did not save the given word processor file to storage controller 34. In alternative embodiments, activity tracking application 74 can automatically update states 76 at specific time intervals.

In the configuration shown in FIG. 2, activity tracking application 74 interacts with web server 78, which is configured to function as a gateway between the activity tracking application and computers 62. In some embodiments, web server 78 enables processor 68 to expose a representational state transfer (REST or RESTful) application programming interface (API) 92 that enables embedding of search capabilities (i.e., the REST API) in client tools, mobile applications, and laptop/desktop computers.

In some embodiments, the functionality of activity tracking application 74 and web server 78 may be incorporated into NAS management application 72. In further embodiments, facility 60 may comprise multiple storage controllers 34, and management module 66 may configure the storage controllers as a NAS cluster, and utilize all the resources in the NAS cluster for distributed file-level services including user state synchronization services using embodiments described herein.

Processors 68, 80 and 84 may comprise general-purpose central processing units (CPU) or special-purpose embedded processors, which are programmed in software or firmware to carry out the functions described herein. The software may be downloaded to modules 36, 66 and computers 62 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Synchronizing User Stateas

Figure 3:
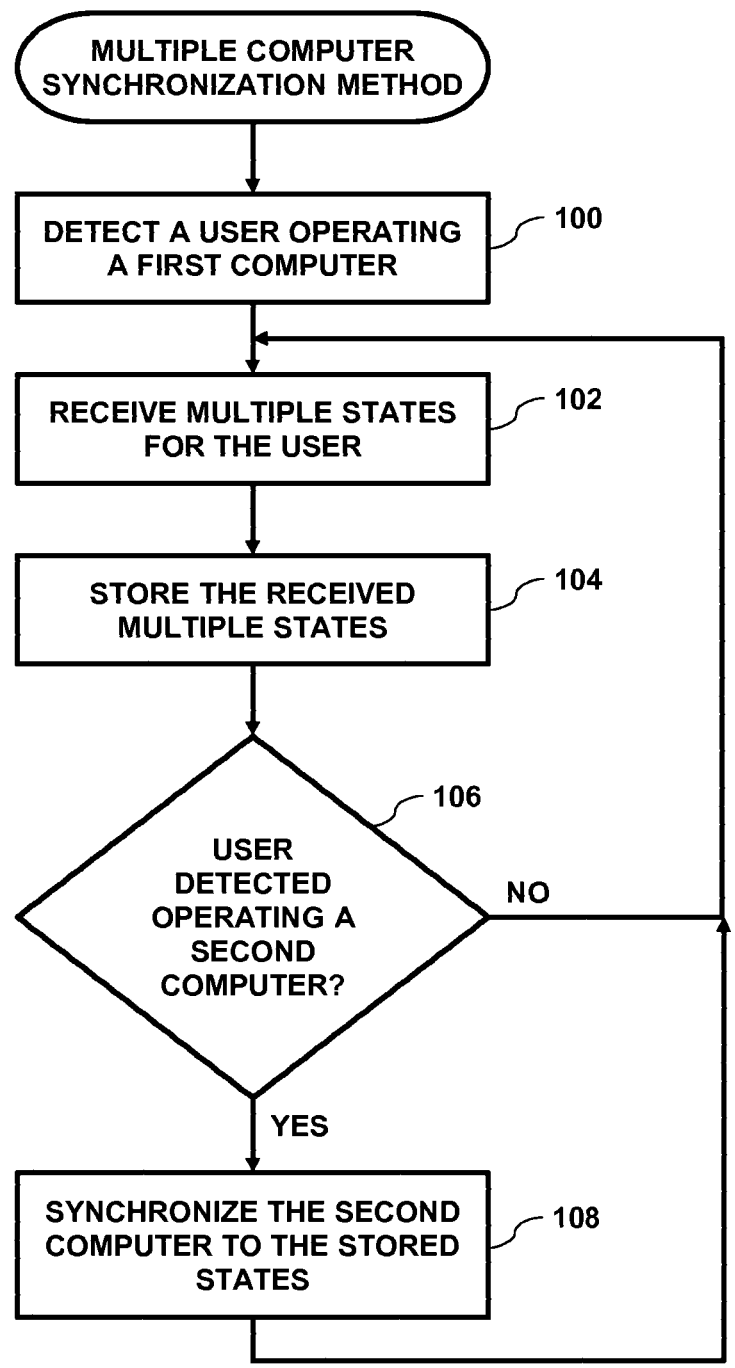
FIG. 3 is a flow diagram that schematically illustrates a method of synchronizing user states across the multiple client computers, in accordance with an embodiment of the present invention.

FIG. 3 is a flow diagram that schematically illustrates a method of management module 66 synchronizing states 76 between multiple computers 62, in accordance an embodiment of the present invention. In a detection step 100, activity tracking application 74 detects a user operating computer 62A (also referred to herein as the first computer). To detect the user operating the first computer, activity tracking client 88A detects the user logging on to the first computer, and activity tracking application 74 receives a message from activity tracking client 88A indicating the user logon.

As the user operates the first computer, activity tracking client 90A transmits states 76A to activity tracking application 74, and the activity tracking application receives the states in a receive step 102 and stores the received states to states 76 in memory 70 in a store step 104. Receiving and storing the received states to memory 70 is also referred to herein as maintaining the states.

Therefore in step 100, activity tracking application 74 detects that the user has logged on to the first computer, and in step 100, the activity tracking application receives states indicating the given client application and the given data file. The received states can include additional information such as a screen layout, and a location in the given data file.

FIG. 4 is a schematic pictorial illustration of a given computer 62 presenting nested windows 110 on a display 112 (e.g., an LCD/LED monitor) coupled to the given computer, in accordance with an embodiment of the present invention. In the configuration shown in FIG. 4, each nested window presents a given client application 88, and the nested windows and the client applications executing on the given computer can be differentiated by appending a letter to the identifying numeral, so that nested window 110A presents a spreadsheet client application 88A, nested window 110B presents an email client application 88B, and nested window 110C presents a word processor client application 88C.

In addition to applications 88, the given computer can present a cursor 114 on display 112. In the example shown in FIG. 4, the given computer presents client applications 88 in a nested windowed configuration as follows:

The given computer presents nested window 110B "behind" nested window 110A, and presents nested window 110C "behind" nested window 110B. In the example shown in FIG. 4, nested window 110A is the "active" window and spreadsheet application 88A is the "active" application that can currently accept input from the user.

The user is currently interacting with the spreadsheet client application at cell "G4", as indicated by a frame 116.

To receive multiple states 76 from the user, the user instructs the computer 62A to start executing one or more client applications 88A. In embodiments of the present invention, activity tracking application 74 detects the user operating the first computer by receiving one or messages from activity tracking client 90A indicating that:

The user has logged on to the computer 62A.

The first computer is executing one or more client applications 88 in response to commands received from the user.

In embodiments of the present invention, states 76 includes information such as dimensions for each nested window 110, a nesting "level" for each window 110, a position of cursor 114, and coordinates (i.e., cell "G4") of frame 116.

Returning to the flow diagram in FIG. 3, in a comparison step 106, if activity tracking application 74 detects the user operating computer 62B (also referred to herein as a second computer), then in a synchronization step 108, the activity tracking application synchronizes the second computer to states 78, and the method continues with step 102. If, in step 106, activity tracking application 74 does not detect the user operating a second computer 62, then the method continues with step 102.

In embodiments of the present invention, activity tracking application 74 detects the user operating the computer 62B by receiving a message from activity tracking client 90B executing on the second computer indicating that the user has logged on to the second computer while the user is still logged on to the first computer.

To synchronize the second computer to states 78, activity tracking application 74 conveys states to computer 62B, and upon receiving the states from the activity tracking application, activity tracking client application 90B loads the applications, the data files, and the screen layout in order that the user can start working on computer 62B as if the user was still working on computer 62B. In other words, if the user operated computer 62A and left the first computer's display presenting nested windows 110, cursor 114 and frame 116 (as shown in FIG. 4), the second computer's display will present the nested windows, the cursor and the frame in a similar layout (if not identical layout, depending on the technical specifications of the first and the second computers) upon activity tracking application synchronizing computer 62B to states 76 using embodiment described herein.

The following example describes a scenario where activity tracking application 74 synchronizes states 76 between a user's laptop and tablet computers (i.e., first and second computers, respectively):

The user opens, on the laptop in the user's office, a budget spreadsheet, a word processing document describing all company employees, and a salary spreadsheet listing employee salaries. The spreadsheets and word processing document are all stored on storage controller 34 that is configured as an NAS system. In the middle of modifying the budget numbers in a specific cell in the budget spreadsheet, the user receives a phone call from home requesting that the user go home immediately. When leaving the office, the user locks the laptop with the spreadsheets and the word processing documents still open.

Upon arriving home, the user launches activity tracking client 88, and upon establishing communication with activity tracking application the NAS client application in the tablet will automatically launch spreadsheet and word processor applications and open the spreadsheets and word processing documents from storage controller 34, via NAS application 72. Upon opening the budget spreadsheet, the tablet presents the budget spreadsheet, on the specific cell he was editing on the laptop (i.e., the tablet presents the most recent updated versions of the files).

While working at home the user makes changes to the file(s), and upon arriving at the office the following day and unlocking the laptop, all the files are still open and presenting the changes the user made at home. In other words, upon detecting, by activity tracking application 74, updates to one or more states 76 while the user operates the tablet (i.e., the second computer), the activity tracking application synchronizes the laptop (i.e., the first computer) to the updated one or more states.

Figure 5:
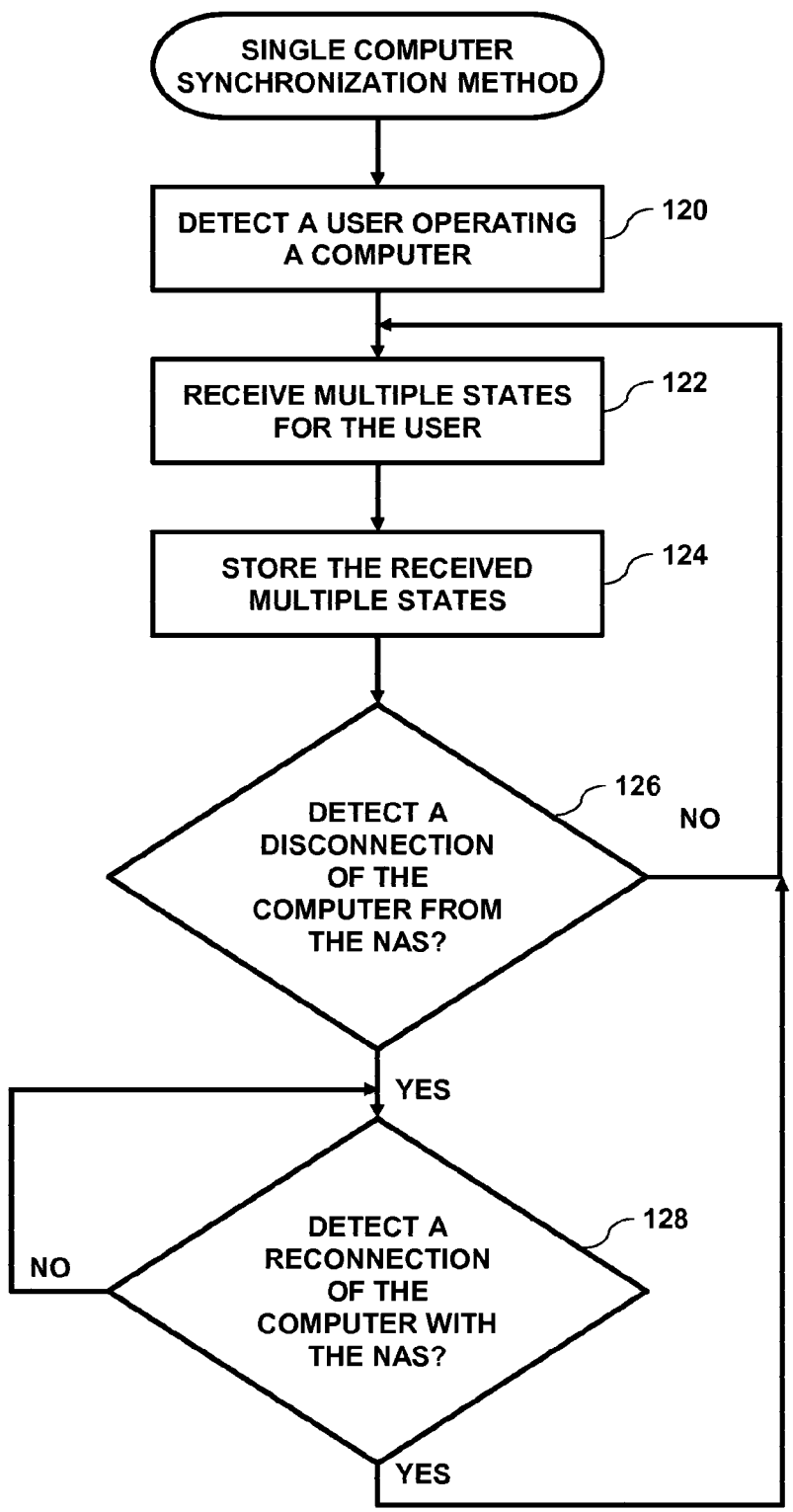
FIG. 5 is a flow diagram that schematically illustrates a method of synchronizing user states of a given client computer, in accordance with an embodiment of the present invention.

FIG. 5 is a flow diagram that schematically illustrates a method of synchronizing user states of computer 62A, in accordance with an embodiment of the present invention. While the example in the flow diagram describes activity tracking application 74 synchronizing states 76 with computer 62A, synchronizing the states with any computing device in communication with NAS application 72 and the activity tracking application is considered to be within the spirit and scope of the present invention.

Using embodiments described hereinabove, activity tracking application 74 detects a user operating computer 62A in a detect step 120, receives states 76A from activity tracking client 90A in a receive step 122, and stores the received states to states 76 in memory 70 in a store step 124. For example, states 76A can reflect a user editing a document in a word processor application.

In a first comparison step 126, if processor 68 detects a disconnection (i.e., a break in communication) between storage controller 34 and computer 62A, then in a second comparison step 128 the management processor waits until it detects a reconnection (i.e., a restoring of communication) between the storage controller and computer 62. While computer 62A is disconnected from storage controller 34, the user makes changes to the document in the word processing application, and activity tracking application 90A updates states 76A responsively to the updates. Upon detecting the reconnection, activity tracking client 90A conveys the updated states 76A to activity tracking application 74, and the activity tracking application updates states 76 in memory 70, thereby resynchronizing file controller 34 with computer 62A.

For example, while in an airport and in communication with file-level storage system 34 via a Wi-Fi hotspot, a user edits a word processing document prior to boarding a flight. The user updates the word-processing document during the flight (while not in communication with the file-level storage system), and upon re-establishing communication with the file-level storage system, activity tracking client 90A transmits states 76A to activity tracking application 74, thereby enabling the activity tracking application to update states 76 in memory 70.

Returning to step 126, if processor 68 does not detect a disconnection of computer 62A from storage controller 34 (i.e., the file-level storage system), then the method continues with step 122.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    detecting, by a file-level storage system, a user operating a first computer in communication with the file level storage system via a network;
    maintaining, while the user is operating the first computer, multiple states for the user, the multiple states comprising preference information entered into the first computer by the user including at least one or more applications executing on the first computer, one or more data files in use by the executing one or more applications, and a current position state and display layout of the one or more data files within the one or more executing applications as entered by the user, wherein the current position state further includes a specific position last used by the user within a text document executing on the one or more applications, and the display layout further includes maintaining metadata indicating how the one or more applications are presented on a display of the first computer including whether the one or more applications are executing in full-screen mode or a tiled and nested window on the display;
    detecting the user operating a second computer in communication with the file level storage system via the network; and
    synchronizing the second computer to the multiple states such that when the user operates the second computer, the multiple states entered by the user on the first computer are automatically propagated to the second computer even when the multiple states entered by the user on the first computer are not saved to the first computer by the user, wherein the multiple states are synchronized to the second computer by tracking each one of the multiple states on the first computer by a tracking application incorporated into a file-level storage system management application, and saving a given one of the multiple states in the file-level storage system management application upon the tracking application detecting that a predetermined number of changes have been rendered to the given one of the multiple states by the user operating the first computer.

2. The method according to claim 1, wherein the file-level storage system comprises a network attached file (NAS) system.

3. The method according to claim 1, wherein each of the states is further selected from a list consisting of one or more additional data files recently in use by the one or more executing applications, a current position in a file system tree, recent searches and sorting preferences.

4. The method according to claim 1, wherein operating the first computer comprises the user logging on to the first computer, and executing the one or more applications on the first computer.

5. The method according to claim 4, wherein operating the second computer comprises the user logging on to the second computer while still logged on to the first computer.

6. The method according to claim 5, the method comprising detecting, by the file-level storage system, an update to a given state while the user operates the second computer, and synchronizing the first computer to the updated given state.

7. The method according to claim 1, wherein maintaining the multiple states comprises detecting a break in communication between the first computer and the file-level storage system, and upon detecting a restoration of communication between the first computer and the file-level storage system, updating the multiple states on the file-level storage system.

8. A file-level storage system, comprising:
a memory; and
a management processor configured:
   to detect a user operating a first computer in communication with a file level storage system via a network,
   while the user is operating the first computer, to maintain, in the memory, multiple states for the user, the multiple states comprising preference information entered into the first computer by the user including at least one or more applications executing on the first computer, one or more data files in use by the executing one or more applications, and a current position state and display layout of the one or more data files within the one or more executing applications as entered by the user, wherein the current position state further includes a specific position last used by the user within a text document executing on the one or more applications, and the display layout further includes maintaining metadata indicating how the one or more applications are presented on a display of the first computer including whether the one or more applications are executing in full-screen mode or a tiled and nested window on the display,
   to detect the user operating a second computer in communication with the file level storage system via the network, and
   to synchronize the second computer to the multiple states such that when the user operates the second computer, the multiple states entered by the user on the first computer are automatically propagated to the second computer even when the multiple states entered by the user on the first computer are not saved to the first computer by the user, wherein the multiple states are synchronized to the second computer by tracking each one of the multiple states on the first computer by a tracking application incorporated into a file-level storage system management application, and saving a given one of the multiple states in the file-level storage system management application upon the tracking application detecting that a predetermined number of changes have been rendered to the given one of the multiple states by the user operating the first computer.

9. The file-level storage system according to claim 8, wherein the file-level storage system comprises a network attached file (NAS) system.

10. The file-level storage system according to claim 8, wherein each of the states is further selected from a list consisting of one or more additional data files recently in use by the one or more executing applications, a current position in a file system tree, recent searches and sorting preferences.

11. The file-level storage system according to claim 8, wherein operating the first computer comprises the user logging on to the first computer, and executing the one or more applications on the first computer.

12. The file-level storage system according to claim 11, wherein operating the second computer comprises the user logging on to the second computer while still logged on to the first computer.

13. The file-level storage system according to claim 12, wherein the management processor is configured to detect an update to a given state while the user operates the second computer, and to synchronize the first computer to the updated given state.

14. The file-level storage system according to claim 8, wherein the management processor is configured to maintain the multiple states by detecting a break in communication between the first computer and the file-level storage system, and upon detecting a restoration of communication between the first computer and the file-level storage system, updating the multiple states on the file-level storage system.

15. A computer program product, the computer program product comprising:
a non-transitory computer readable storage medium having computer readable program code embodied therewith, the computer readable program code comprising:
computer readable program code configured to detect a user operating a first computer in communication with a file level storage system via a network;
computer readable program code configured to maintain, while the user is operating the first computer, multiple states for the user, the multiple states comprising preference information entered into the first computer by the user including at least one or more applications executing on the first computer, one or more data files in use by the executing one or more applications, and a current position state and display layout of the one or more data files within the one or more executing applications as entered by the user, wherein the current position state further includes a specific position last used by the user within a text document executing on the one or more applications, and the display layout further includes maintaining metadata indicating how the one or more applications are presented on a display of the first computer including whether the one or more applications are executing in full-screen mode or a tiled and nested window on the display;
computer readable program code configured to detect the user operating a second computer in communication with the file level storage system via the network; and
computer readable program code configured to synchronize the second computer to the multiple states such that when the user operates the second computer, the multiple states entered by the user on the first computer are automatically propagated to the second computer even when the multiple states entered by the user on the first computer are not saved to the first computer by the user, wherein the multiple states are synchronized to the second computer by tracking each one of the multiple states on the first computer by a tracking application incorporated into a file-level storage system management application, and saving a given one of the multiple states in the file-level storage system management application upon the tracking application detecting that a predetermined number of changes have been rendered to the given one of the multiple states by the user operating the first computer.

16. The computer program product according to claim 15, wherein the file-level storage system comprises a network attached file (NAS) system.

17. The computer program product according to claim 15, wherein each of the states is further selected from a list consisting of one or more additional data files recently in use by the one or more executing applications, a current position in a file system tree, recent searches and sorting preferences.

18. The computer program product according to claim 15, wherein operating the first computer comprises the user logging on to the first computer, and executing the one or more applications on the first computer.

19. The computer program product according to claim 18, wherein operating the second computer comprises the user logging on to the second computer while still logged on to the first computer.

20. The computer program product according to claim 19, and comprising computer readable program code configured to detect an update to a given state while the user operates the second computer, and to synchronize the first computer to the updated given state.

\* \* \* \* \*